UNITED STATES PATENT OFFICE.

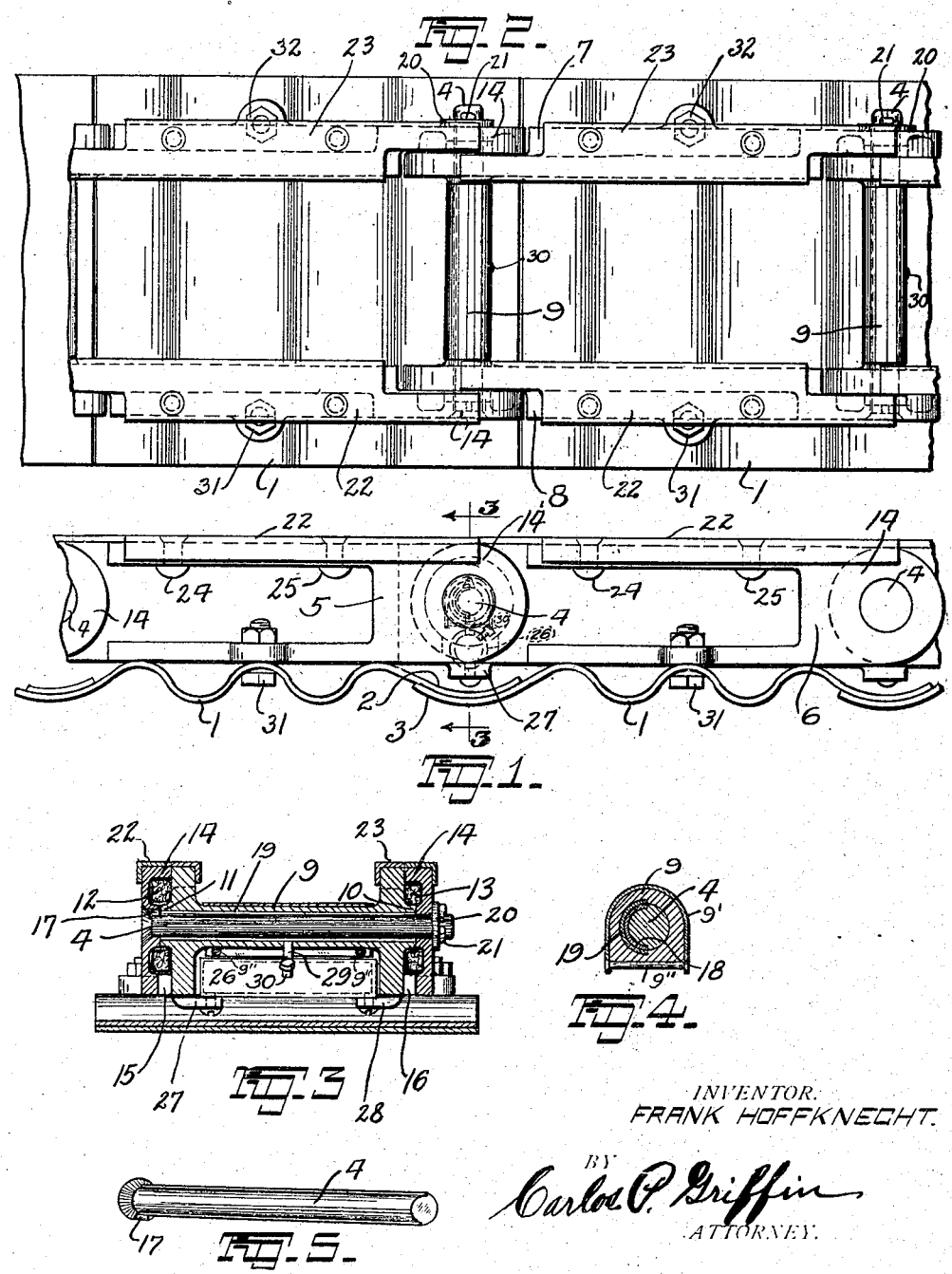

FRANK HOFFKNECHT, OF MERCED, CALIFORNIA.

TREAD FOR TRACTORS.

1,223,050.  Specification of Letters Patent.  Patented Apr. 17, 1917.

Application filed April 12, 1916. Serial No. 90,638.

*To all whom it may concern:*

Be it known that I, FRANK HOFFKNECHT, a citizen of the United States, residing at Merced, in the county of Merced, State of California, have invented a new and useful Tread for Tractors, of which the following is a specification in such full and clear terms as will enable those skilled in the art to construct and use the same.

This invention relates to a tread for tractors and its object is to produce a tread, parts of which may be readily renewed whenever necessary and which will have suitable means for preventing the access of dust to the working parts thereof.

It will be understood by those skilled in the art that this invention applies to tractors of that type in which a chain passes over a series of wheels and which chain forms the surface over which the tractor travels, there being from four to six feet of chain in contact with the ground at all times.

Other objects of the invention will appear as the description proceeds.

An embodiment of the invention is shown in the drawing in which the same reference numeral is applied to the same portion throughout, but I am aware that there may be many modifications thereof, Figure 1 is a side elevation of two of the tread links, Fig. 2 is a plan view of two of the tread links, Fig. 3 is a vertical sectional view of the tractor link at one of the connecting pins, Fig. 4 is a transverse sectional view of one of the connecting pins and the tube within which it operates showing the wear plates, and Fig. 5 is a perspective view of the pin used for connecting two of the links together.

The numeral 1 represents the corrugated plates which lie in contact with the ground, said plates having curved portions 2 and 3 which overlap and which are formed on a curve, whose center is at the center of the pin 4, which connects the two links 5 and 6 together. The links 5 and 6 have flanged side pieces 7 and 8 which extend longitudinally with respect to the chain and said side pieces are connected by means of an integral tubular member 9. The links are formed of cast steel in a single piece. The object of having the curves at the end of the plates 1 as indicated at 2 and 3 is to provide means whereby the plates may move in contact with each other without opening up, thereby preventing the dirt and mud from working up on to the top of the plates 1.

At the sides of the members 7 and 8 there are tubular projections 10 and 11, which projections receive felt washers 12 and 13, which washers fill the space between the adjoining link members, the inner side of the outer link members being flanged as indicated at 14 to provide a receptacle for the felt washers 12 and 13 and said flanges have slots cut at 15 and 16 to allow the links to be assembled.

The connecting pins 4 each have a key as indicated at 17 to prevent them from turning, and on one side they have a recess to receive a half bushing 18, while the tubular member 9 is recessed to receive an oppositely placed half tubular bushing 19. The bushing 18 extends through the outside members the full length of the pin 4 in order to prevent it from turning should it become worn. The pin is held in place by means of a suitable washer 20 and cotter pin 21.

Since the load is carried by rollers which contact with the upper edges of the link members 7 and 8, they are provided with renewable plates 22 and 23, said plates having flanges which depend over the edges of the link members, thereby protecting the side of the links as well as the upper edges. These wear plates are suitably riveted to the flanged links by means of rivets 24 and 25. Immediately below the cross pin there is placed a tubular oil receptacle 26 which is supported on two lugs 27 and 28 extending from the side members of the links. A pipe 29 enables the oil to run into the tubular sleeve 9 whenever the tank is above the sleeve and the tank is filled by means of a cap 30.

The removable corrugated plates 1 are connected to the flanges of the links by means of suitable bolts 31 and 32.

In order to prevent the sprockets from wearing out the main castings which form the chain, the connecting cross bar 9 is covered with a renewable sleeve 9' held in place thereon by means of rivets 9".

Having thus described my invention what I claim as new and desire to secure by Let- ters Patent of the United States, is as follows, express reservation being made of permissible modifications:

1. A tractor tread comprising a plurality of links each having two side members with an integral tubular connecting member at one end of the side members, one link being adapted to fit over another link, a pin pivotally connecting the two links, oppositely projecting collars at each side of two connected links, said links being formed with a groove around each collar, a packing in said groove, two wear plates, one let into the pin and the other into the tubular member, and bearing plates connected to the links.

2. A tractor tread comprising a plurality of links each having two side members with an integral tubular member connecting them at one end, one link being adapted to fit over another link, a pin pivotally connecting each pair of links, oppositely projecting collars on each side of the two connecting links, said links being formed with a groove around each collar, a packing in each groove, two wear plates one let into the pin and the other into the tubular member, an oil receptacle and means to deliver oil therefrom to said pin, lugs carried by the links for support of said oil receptacle, removable ground bearing plates connecting with the links and removable wear plates secured to the links on the opposite side therefrom to the ground plates.

In testimony whereof I have hereunto set my hand this 5th day of April, A. D. 1916.

FRANK HOFFKNECHT.

Witnesses:
J. M. OLIVER,
K. J. EASLY, Jr.